(12) United States Patent
Lin et al.

(10) Patent No.: US 9,311,818 B2
(45) Date of Patent: Apr. 12, 2016

(54) DYMANIC FUSION METHOD AND DEVICE OF IMAGES

(71) Applicant: INDUSTRIAL TECHNOLOGY RESEARCH INSTITUTE, Hsin-Chu (TW)

(72) Inventors: Che-Tsung Lin, Hsinchu (TW); Yu-Chen Lin, Taipei (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 207 days.

(21) Appl. No.: 14/158,224

(22) Filed: Jan. 17, 2014

(65) Prior Publication Data

US 2014/0341434 A1 Nov. 20, 2014

(30) Foreign Application Priority Data

May 17, 2013 (TW) .................................. 102117563

(51) Int. Cl.
*G06K 9/00* (2006.01)
*G08G 1/16* (2006.01)
*B60R 1/00* (2006.01)
*G06T 7/00* (2006.01)
*G06T 19/00* (2011.01)

(52) U.S. Cl.
CPC *G08G 1/166* (2013.01); *B60R 1/00* (2013.01); *G06T 7/003* (2013.01); *G06T 19/00* (2013.01); *G08G 1/161* (2013.01); *G08G 1/167* (2013.01); *B60R 2300/50* (2013.01); *G06K 9/00791* (2013.01); *G06T 2207/20221* (2013.01); *G06T 2207/30252* (2013.01); *G06T 2210/62* (2013.01)

(58) Field of Classification Search
USPC .......................................................... 382/104
See application file for complete search history.

(56) References Cited

U.S. PATENT DOCUMENTS

| 8,345,098 B2 | 1/2013 | Grigsby et al. |
| 8,368,755 B2 | 2/2013 | Nishida et al. |
| 8,395,490 B2 | 3/2013 | Yuda |

(Continued)

FOREIGN PATENT DOCUMENTS

| CN | 101242523 | 8/2008 |
| CN | 102474596 | 5/2012 |

(Continued)

OTHER PUBLICATIONS

A DSRC-based collision warning and autonomous system for inter-vehicle communication Chun-Liang Chen; Hsu, C.W Chi-Ming Wucommunication 2011 Cross Strait Quad-Regional Radio Science and Wireless Technology Conference (CSQRWC) 2011 p. 816-p. 821.

(Continued)

*Primary Examiner* — Yon Couso
(74) *Attorney, Agent, or Firm* — WPAT, PC; Justin King

(57) ABSTRACT

A dynamic fusion method of images includes: receiving broadcast information from surrounding vehicles of a host vehicle; determining whether at least one of the surrounding vehicles travels in the same lane as the host vehicle to become a neighboring vehicle of the host vehicle according to the broadcast information; determining whether the neighboring vehicle is too close to the host vehicle and blocks the view of the host vehicle; and performing a transparentization or trans-lucentization process on the neighboring vehicle in an image captured by the host vehicle when the neighboring vehicle blocks the view of the host vehicle.

26 Claims, 4 Drawing Sheets

(56) References Cited

U.S. PATENT DOCUMENTS

| | | | |
|---|---|---|---|
| 2007/0021915 A1 | 1/2007 | Breed et al. | |
| 2007/0058717 A1 | 3/2007 | Chosak et al. | |
| 2008/0186382 A1* | 8/2008 | Tauchi | G01S 13/89 348/148 |
| 2009/0256908 A1 | 10/2009 | Chen et al. | |
| 2010/0191391 A1* | 7/2010 | Zeng | G01S 13/723 701/1 |
| 2010/0328055 A1* | 12/2010 | Fong | B60Q 9/005 340/425.5 |
| 2011/0115615 A1* | 5/2011 | Luo | B60R 1/00 340/436 |
| 2011/0181620 A1 | 7/2011 | Hung | |
| 2012/0294549 A1 | 11/2012 | Doepke | |

FOREIGN PATENT DOCUMENTS

| | | |
|---|---|---|
| TW | M369475 U | 11/2009 |
| TW | 201025189 A | 7/2010 |
| TW | 201111199 | 4/2011 |
| TW | I362337 B | 4/2012 |
| TW | 201222422 A | 6/2012 |

OTHER PUBLICATIONS

A Cooperative Collision Early-Warning System for vehicles in the curve environment Chung-Ming Huang; Shih-Yang Lin 2010 IEEE Symposium on Computers and Communications 2010 p. 14-p. 19.

A WAVE/DSRC-based intersection collision warning system Chia-Hsiang Chang; Chih-Hsun Chou; Cheng-Jung Lin; Ming-Da Lee 2009 International Conference on Ultra Modern Telecommunications & workshops 2009 p. 1-p. 6.

Panoramic video stitching in multi-camera surveillance system Bin He; Gang Zhao; Qifang Liu 2010 International Conference of Image and Vision Computing 2010 p. 1-p. 6.

A Centralized Traffic Control Mechanism for Evacuation of Emergency Vehicles Using the DSRC Protocol Chung-Ming Huang; Chia-Ching Yang; Chun-Yu Tseng;Chih-Hsun Chou 2009 International Symposium on Wireless Pervasive Computing 2009 p. 1-p. 5.

Accurate planar image registration for an integrated video surveillance system Yung-Cheng Cheng; Kai-Ying Lin; Yong-Sheng Chen; Jenn-Hwan Tarng; Chii-Yah Yuan; Chen-Ying Kao 2009 IEEE workshop on Computational Intelligence for Visual Intelligence 2009 p. 37-p. 43.

An Efficient Solution to the Five-Point Relative Pose Problem David Niste' r, Member, IEEE IEEE Transactions on Pattern Analysis and Machine Intelligence, vol. 26, No. 6, Jun. 2004 p. 756.

In Defense of the Eight-Point Algorithm Richard I. Hartley IEEE Transactions on Pattern Analysis and Machine Intelligence, vol. 19, No. 6, Jun. 1997 p. 580.

Taiwan Intellectual Property Office (TIPO), Office Action issued Jan. 12, 2016.

* cited by examiner

DYMANIC FUSION METHOD AND DEVICE OF IMAGES

CROSS REFERENCE TO RELATED APPLICATION

This application also claims priority to Taiwan Patent Application No. 102117563 filed in the Taiwan Patent Office on May 17, 2013, the entire content of which is incorporated herein by reference.

TECHNICAL FIELD

The present disclosure relates to a dynamic fusion method and device of images.

BACKGROUND

For vehicles traveling in the same lane and carrying compatible inter-vehicle communication devices, a visual blind spot is possible to a driver of a following vehicle if he/she drives too close to the preceding vehicle, even though the images captured by the preceding vehicle can be shared with the following vehicle in the same lane. The reason why the images captured by the preceding vehicle are usually helpless for the following drivers in promoting driving safety is that it is hard for them to interpret the driving condition in front of the preceding and his/her vehicle simultaneously. When a vehicle stays very close to it preceding vehicle because of traffic jam or any other reason, a collision is highly possible. A major reason for such a collision is mainly because, the driver does not have enough time to maneuver his/her vehicle not to hit the preceding vehicle while meeting any emergency situation of the preceding vehicles. Definitely, the limited naked-eye viewing range of the driver, further narrowed by the tiny spacing with the preceding vehicle (namely, broadening the visual blind spot of the driver), may also increase the possibility of such accident.

In the cooperative safety applications of active safety systems, in order to minimize collision possibilities, an inter-vehicle communication means is provided for enabling a host vehicle to receive the positioning data of neighboring vehicles. However, when the preceding vehicle is located exactly at a blind spot of the host vehicle, the driver of the host vehicle may still remain unaware of a system warning that foresees an immediate crisis. In a collision warning system of another vehicle using inter-vehicle communication means, information of any emergency braking of front vehicles can be passed on to the following vehicles so as to prevent the chain collision. In such a technique, the driver of the host vehicle is still questionable to react appropriately in time for the vehicle transmitting signals of emergency braking are not directly seen by the host vehicle. In another conventional monitoring system, a panoramic image generated by stitching a plurality of images captured by a plurality of cameras is introduced to replace the monitored image from a specific camera so as to let monitoring staff directly see the global view of a specific place. However, even though all the vehicles in the same lane are equipped with cameras and inter-vehicle communication devices, the innovative image stitching technique is not capable of eliminating the visual blind spots of the drivers.

Therefore, there is a need for a dynamic fusion method and device of images for compensating the above issues.

SUMMARY

Accordingly, this disclosure is directed to a dynamic fusion method and device of images. By applying a technique of epipolar geometry analysis, the dynamic fusion of images can be achieved. Namely, by applying the technique, blind spot pixels in the image can be in-painted by their counterpart in the image without blind spots. In a driving safety warning system, an image captured by the preceding vehicle and an image captured by the host vehicle are fused in a way that the preceding vehicle (which causes the blind spot to the image of the host vehicle) becomes transparent or at least translucent. Thus, a driver of the host vehicle is enabled to directly observe the driving conditions ahead without blind spot so that a little more reaction time can be gained against a possible emergency situation. Upon such an arrangement, the driving comfort as well as the driving safety can then be substantially improved.

In an embodiment of the present invention, a dynamic fusion method of images comprises a step of receiving broadcast information transmitted from surrounding vehicles of a host vehicle, a step of determining according to the broadcast information whether at least one of the surrounding vehicles travels longitudinally with the host vehicle in the same lane, and defining the at least one of the surrounding vehicles individually and correspondingly as at least one neighboring vehicle of the host vehicle, a step of determining whether a preceding vehicle from the at least one neighboring vehicle exists, wherein the preceding vehicle travels along just in front of the host vehicle and blocks a view of the host vehicle, and a step of performing a transparentization or translucentizatoin process on the preceding vehicle when the preceding vehicle is spaced from the host vehicle at a distance less than a predetermined minimum spacing.

In another embodiment of the present invention, a dynamic fusion device of images comprises a capturing unit for capturing surrounding images of a host vehicle; a receiving unit for receiving broadcast information transmitted from surrounding vehicles of the host vehicle; and a processing unit coupled to the receiving unit and the capturing unit for determining whether at least one of the surrounding vehicles travels longitudinally with the host vehicle in the same lane, for defining at least one of the surrounding vehicles individually and correspondingly as at least one neighboring vehicle of the host vehicle, for determining whether a preceding vehicle from the at least one neighboring vehicle exists, wherein the preceding vehicle travels along just in front of the host vehicle and blocks a view of the host vehicle, and for performing a transparentization or translucentizatoin process on the preceding vehicle when the preceding vehicle is spaced from the host vehicle at a distance less than a predetermined minimum spacing.

In a further embodiment of the present invention, a dynamic fusion and transparentization method of images comprises a step of basing on feature correspondences in images captured by a host vehicle and a preceding vehicle located in front of the host vehicle to obtain respective epipoles and a ratio factor describing a ratio relation of pixels near the two epipoles, a step of extracting an image near the epipole of the image of the preceding vehicle, and scaling down the extracted image according to the ratio factor, and a step of blending the scaled image with pixels within a boundary near the epipole of the image of the host vehicle.

BRIEF DESCRIPTION OF THE DRAWINGS

The following disclosure of the present invention will become more fully understood from the detailed description given herein below and the accompanying drawings which are given by way of illustration only, and thus are not limitative of the present disclosure and wherein.

DETAILED DESCRIPTION

Figure 1:
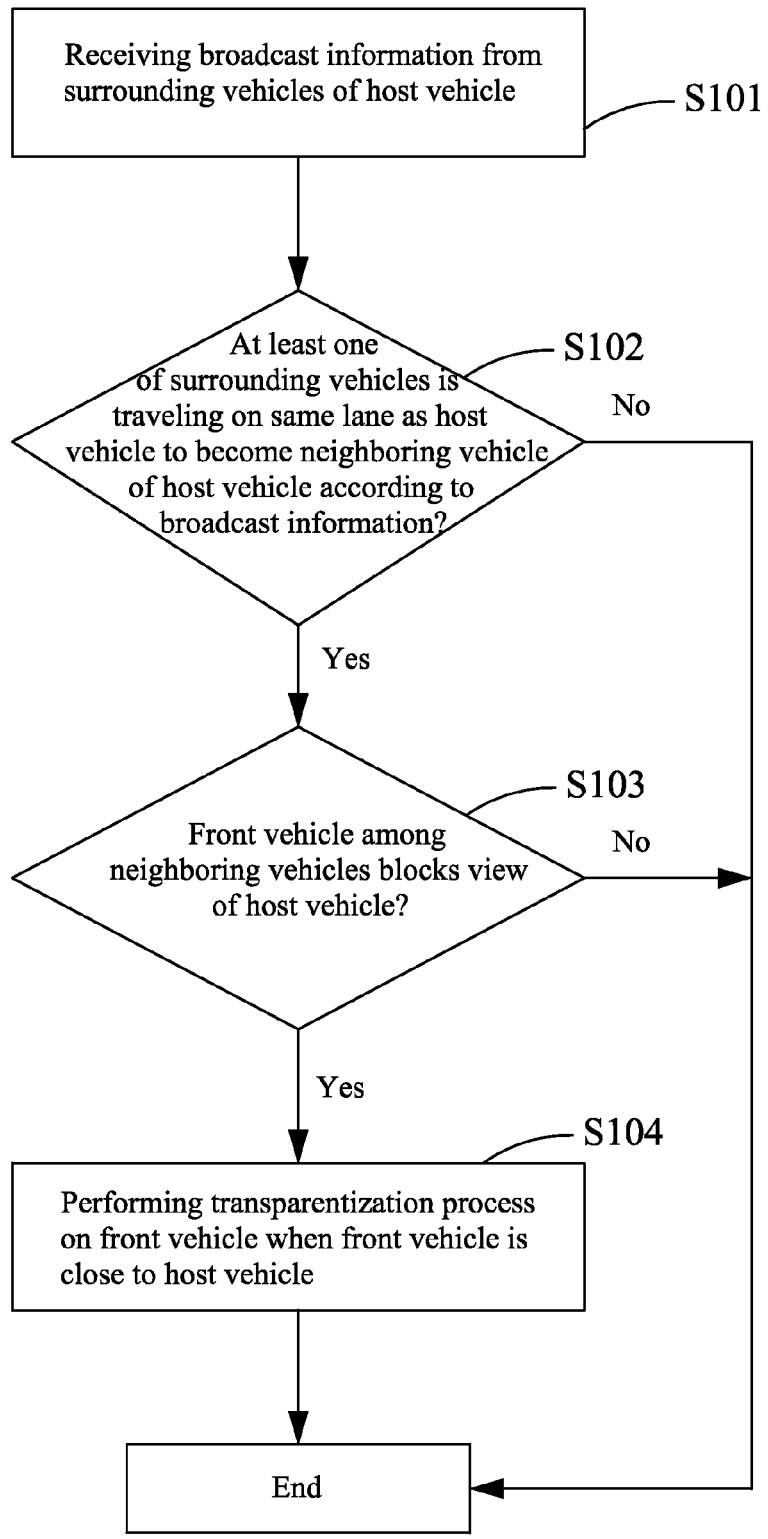
FIG. 1 is a flowchart of a dynamic fusion method of images according to an embodiment of the present disclosure.

In the following detailed descriptions, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 shows a dynamic fusion method of images according to an embodiment of the disclosure. The dynamic fusion method as shown comprises a step of receiving broadcast information from surrounding vehicles of a host vehicle (step s101); a step of determining whether at least one of the surrounding vehicles travels longitudinally along a lane the same as the host vehicle does, to such an extent that all the vehicles travelling along the same lane with the host vehicle are defined as the neighboring vehicles of the host vehicle (step s102); a step of determining whether one of the neighboring vehicles is a vehicle that travels just in front of the host vehicle and thus blocks a view of the host vehicle (step s103), so that the aforesaid vehicle is defined as the preceding vehicle with respect to the host vehicle; and a step of performing a transparentization process upon the preceding vehicle if the preceding vehicle is spaced from the host vehicle at a distance less than a predetermined minimum spacing (step s104). Herein, the broadcast information may include both image and position information of the surrounding vehicles, and a resulted level of the transparentization process may be a state of transparency, semi-transparency, or any middle one between transparency and opaqueness.

In this embodiment, the step of performing the transparentization process may include: a step of calculating or estimating a fundamental matrix that can describe a pixel relation between the image of the preceding vehicle and that of the host vehicle according to the feature correspondences in the aforesaid images, so as thereby to obtain individual epipoles (the projection of the optical centers of each camera) and a ratio factor describing a ratio relation of neighboring pixels of each epipole; a step of extracting an image near the epipole of the preceding vehicle and scaling down the extracted image according to the ratio factor; and then blending the scaled image with the pixels around the epipole inside the image captured by the host vehicle within the boundary of the preceding vehicle body inside the image perceived by the host vehicle, wherein the boundary is detected according to a vehicle detection algorithm. The step of performing the transparentization process further may include a step of obtaining the feature points in the images of the preceding vehicle and the host vehicle and deriving a corresponding relation to obtain the feature correspondences (matched feature points) according to an algorithm, wherein the algorithm is a scale-invariant feature transform (SIFT) algorithm or a speeded-up robust feature (SURF) algorithm.

The images of the preceding vehicle and the host vehicle may be captured by a plurality of image sensors. One of the image sensors is an infrared image capturing device, a photoelectric coupling element, and/or a metal-oxide semiconductor (MOS) photosensitive element. When the image sensors are respectively installed in the preceding vehicle and the host vehicle, the images can be mutually transmitted via a wireless communication. The broadcast information which might be positioning results or images can then be transmitted via the wireless communication, which may include a Dedicated Short Range Communications/Wireless Access in a Vehicular Environment (DSRC/WAVE), a Wi-Fi, a WiMax or an LTE.

In the image dynamic fusion method, a geometric relation of the images may be obtained according to the feature correspondences of the images, and the images may be integrated, combined or superimposed by the geometric relation so as to form the transparentized preceding vehicle in the image of the host vehicle. The ratio relation can be regressed into a linear or non-linear formula, and a coordinate system of the ratio relation may have its coordinate centered at the epipole of the image of the host vehicle or any pixel inside the image.

Figure 2:
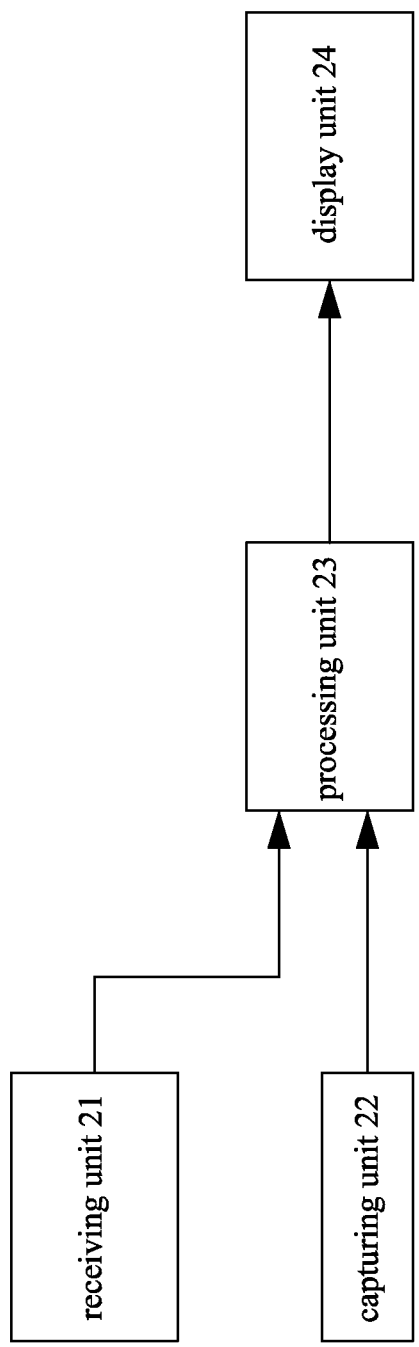
FIG. 2 is a block diagram of a dynamic image fusion device according to an embodiment of the present disclosure.

FIG. 2 shows a dynamic fusion device for images according to one embodiment of the disclosure. The dynamic fusion device as shown includes a capturing unit 22, a receiving unit 21, a processing unit 23 and a display unit 24. The capturing unit 22 for capturing surrounding images of a host vehicle can be an image sensing device such as a video camera, a camera or any other image capturing device the like. The receiving unit 21 receives both the broadcast information from surrounding vehicles of the host vehicle and the surrounding images captured by the capturing unit 22. Based on the broadcast information, the processing unit 23, coupled to the receiving unit 21 and the capturing unit 22, (1) determines whether at least one of the surrounding vehicles of the host vehicle travels in a lane the same as the host vehicle travels so as to define the neighboring vehicles of the host vehicle, (2) determines whether a preceding vehicle blocking a view of the host vehicle exists among the neighboring vehicles, and (3) performs a transparentization process upon the preceding vehicle when the preceding vehicle is too close to the host vehicle (i.e., if the preceding vehicle is detected to be spaced from the host vehicle at a distance less than a predetermined minimum spacing). The display unit 24, coupled to the processing unit 23, displays the transparentized preceding vehicle. The display unit 24 may be a head-up display, a screen or any other display device the like. The broadcast information may include the images and positioning information of the surrounding vehicles. A level of the transparentization process may be a transparent state, a semitransparent state, or any middle state between the transparent state and an opaque state. The image sensor can be an infrared image capturing device, a photoelectric coupling element, or a MOS photosensitive element.

The transparentization process performed by the processing unit 23 can include a step of basing on feature correspondences in the images captured by the preceding vehicle and by the host vehicle to obtain respective epipoles of the corresponding images and a ratio factor describing a ratio relation of neighboring pixels of the two epipoles, a step of extracting an image near the epipole of the preceding vehicle, a step of scaling down the extracted image according to the ratio factor, and a step of blending the scaled image with the pixels within a boundary of the image of the host vehicle, in which the boundary is detected according to a vehicle detection algorithm by regarding the epipole of the image of the host vehicle as a center. The step of performing the transparentization process can further include a step of obtaining the feature points in the images of the preceding vehicle and the host vehicle and then matching such points based on a corresponding relation to obtain the feature correspondences according to a predetermined algorithm, in which the predetermined algorithm can be a SIFT algorithm or a SURF algorithm.

In the present disclosure, relative scenes captured by the two cameras are evaluated and processed by introducing an image analysis algorithm. In the analysis process, the position of the preceding vehicle is identified with respect to the image captured by the host vehicle, and then the image captured by the preceding vehicle is adjusted according to an appropriate scale so as to in-paint a blind spot caused by the preceding vehicle in the image captured by the host vehicle. Upon such an arrangement, a driver of the host vehicle is allowed to observe or "see through" a transparentized or semi-transparentized preceding vehicle on a display screen of the host vehicle.

Figure 3:
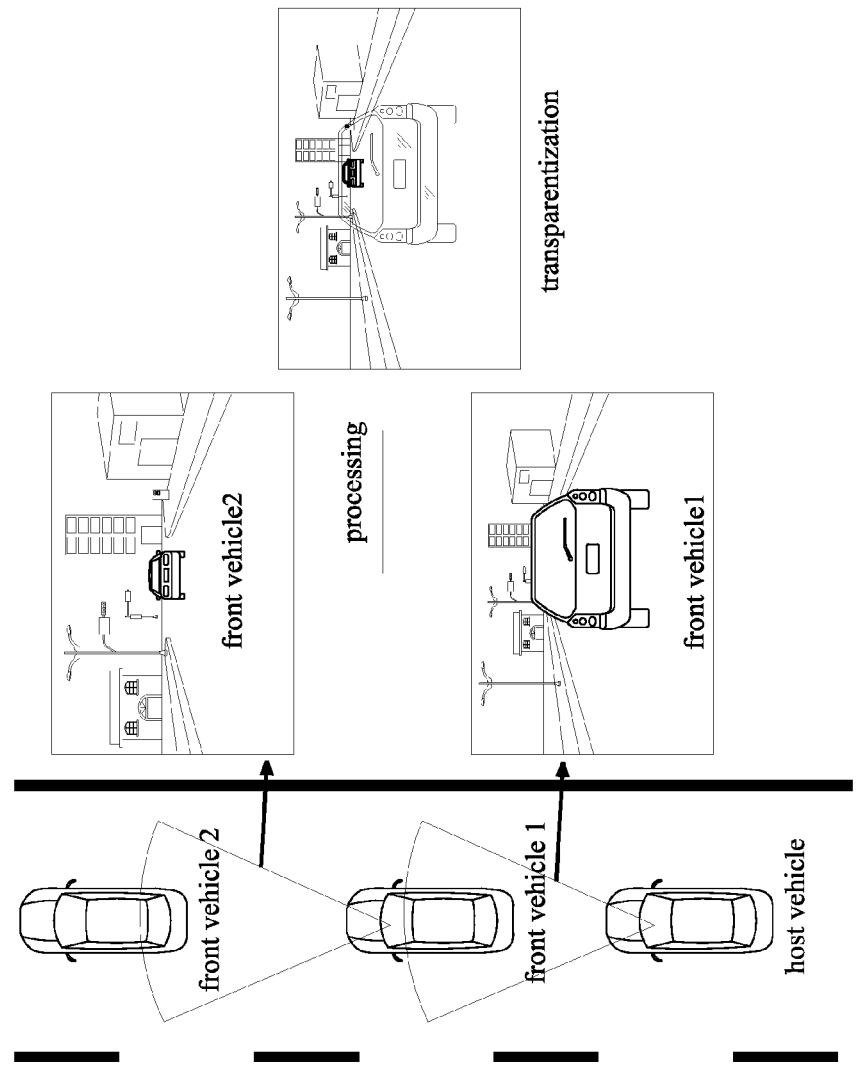
FIG. 3 and FIG. 4 are two exemplary embodiments of the present disclosure.
Figure 4:
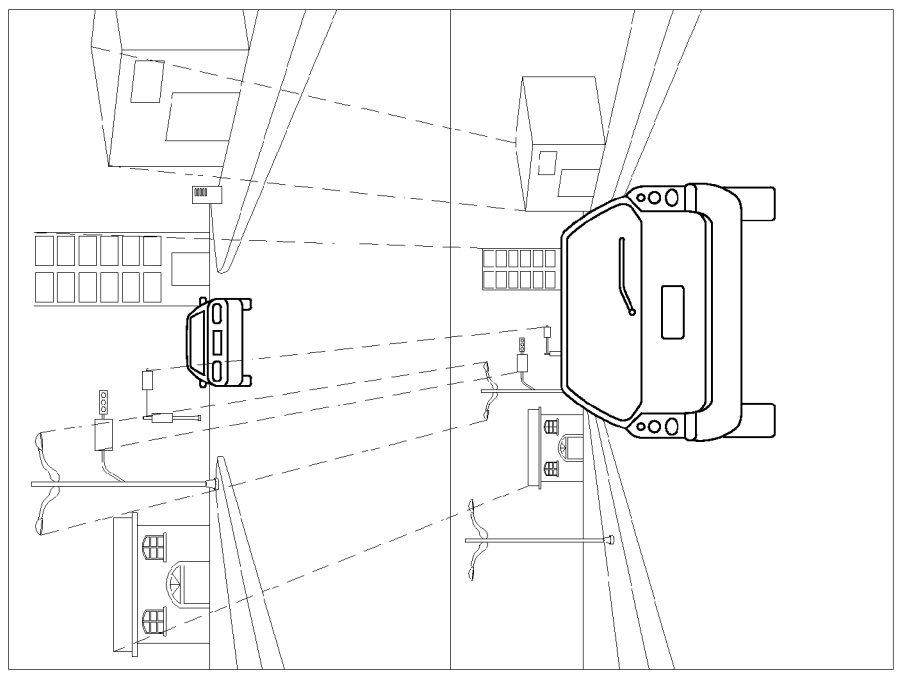

FIGS. 3 and 4 show exemplary embodiments of the disclosure. As shown in FIG. 3, a host vehicle, a preceding vehicle 1 travelling ahead of the host vehicle and a further-preceding vehicle 2 travelling ahead of the preceding vehicle 1 are all equipped with individual image fusion devices of images of FIG. 2. The capturing unit 22 of the host vehicle captures an image of the preceding vehicle 1, and the preceding vehicle 1 captures an image of the further-preceding vehicle 2. The image captured by the preceding vehicle 1 is transmitted to the receiving unit 21 of the host vehicle. When the further-preceding vehicle 2 brakes or a collision occurs between the preceding vehicle 1 and the further-preceding vehicle 2, the image captured by the preceding vehicle 1 and the one captured by the host vehicle could be used to transparentize preceding vehicle's body inside the image captured by the host vehicle to let the host driver directly see what happens in-between the preceding vehicle 1 and the further-preceding vehicle 2 so as to react in advance and avoid collision accident. More specifically, referred to FIGS. 3 and 4, the feature correspondences can be obtained by finding a plurality of feature points in the images captured by the host vehicle and the preceding vehicle and matching such points with a scale-invariant feature transform (SIFT) algorithm, a speeded-up robust features (SURF) algorithm, or any algorithm capable of obtaining a correspondence between two images. Based on the feature correspondences, a relation between the two images can be related by a rotation and translation. Assuming that the feature correspondence in the coordinate of the preceding image is p and p' in the coordinate of the host image, the relation between the feature correspondence is:

$$p'^t F p = 0 \qquad (1)$$

That is, the relation between each pair of correspondences can be described by a fundamental matrix F. The fundamental matrix F may be solved by a calibrated five point algorithm, as disclosed detailedly in a publication by D. Nister., in "An Efficient Solution to the Five-Point Relative Pose Problem. IEEE Trans. Pattern Anal'. Machine Intell.", pages 756-770, 2004, or a normalized eight point algorithm, as disclosed in a publication by R. I. Hartley, in R. I. Hartley. In Defense of the Eight-Point Algorithm. IEEE Trans. Pattern Anal. Machine Intell.", 19, 1997.

In practicing the aforesaid two algorithms, at least five pairs or eight pairs of correspondences shall be employed to obtain a meaningful matrix F. However, it is possible that these five or eight pairs of correspondences might be biased data interfered by noises but still be carelessly used. Thus, to enhance the accuracy and robustness of estimating the matrix F, a random sample consensus (RANSAC) algorithm can be introduced to calculate a statistically better F. In the calculation, it is assumed that, among a plurality set of five or eight correspondences randomly selected by the RANSAC algorithm, at least one set thereof is not interfered by noises. By repeatedly and randomly selecting five or eight correspondences to estimate F and substituting the unselected and rest feature correspondences back into $|P'^t F p|$, then an acceptable noise-cancelled matrix F can be determined by comparing the minimum average value or the median value of $|P'^t F p|$ among each random five-point and eight-point selection. The acceptable F is regarded as an optimal F estimated by the RANSAC algorithm. Further, by applying a singular value decomposition (SVD) upon the optimal F, an epipole e' of the image captured by the host vehicle and an epipole e of the image captured by the preceding vehicle can be obtained.

As shown in FIGS. 3 and 4, from perspectives of the camera of the preceding vehicle 1 and the camera of the host vehicle, the same object in the image of the host vehicle is theoretically smaller than that in the image of the preceding vehicle 1. The ratio for scaling, i.e., the scale factor, can be estimated with respect to the feature correspondences in the images of the preceding and host vehicles. For example, the scale factor can be estimated by a linear regression analysis. Further, pixels around the epipole of the preceding vehicle are blended with corresponding pixels around the epipole of the host vehicle, so that the blind spot in the image of the host vehicle caused by the body of the preceding vehicle 1 can be eliminated. Moreover, the regression formula for obtaining the scale factor can be expressed in a polar coordinate system having the epipole as the origin. Namely, the coordinates of feature correspondences are expressed by a radius and an angle with respect to the origins of the two polar coordinate systems and regressed by a linear equation. Even though the feature correspondences might be interfered by noises, the RANSAC algorithm jointly with a least square algorithm can still be applicable to model the relation of the pixels with respect to the epipole of the image captured by preceding vehicle and the ones with respect to the epipole of the image captured by the host vehicle. More specifically, assume that there are an m number of sets of feature correspondences, the coordinate of the correspondence i in the host image (image of the host vehicle) is denoted by an $X'_i$, and then a vector $X'_i-e'$ relative to the epipole is represented by the polar coordinate $(\rho'_i, \theta'_i)$. Similarly, assume that the coordinate of the correspondence i in the preceding image (image of the preceding vehicle 1) is denoted by an $X_i$, and then a vector $X_i-e$ relative to the epipole is now represented by $(\rho_i, \theta)$. The least square algorithm is repeated for a k number of times, with an n number of pairs of correspondences randomly selected each time, where 2<n<m. Results obtained from the $j^{th}$ calculation are $a_j$ and $b_j$. By minimizing $$\sum_{i=1}^{m} |\rho'_i - a_j \rho_i - b_j|,$$

the optimal $a_j$ (the optimal slope) and the optimal $b_j$ (the optimal intercept) can be obtained.

A set of optimal gradient $A_j$ and optimal intercept $B_j$ that can best describe an angle change between the preceding image and the host image in the polar coordinate system can also be obtained through a similar approach by minimizing $$\sum_{i=1}^{m} |\theta'_i - A_j \theta_i - B_j|.$$

With a given vehicle detection result, a range of a blind spot caused by the body of the preceding vehicle 1 in the image captured by the host vehicle can then be derived. Pixels of the host image within the range are fused individually by the corresponding pixels with respective polar coordinates (ρ', θ') centered at the epipole, where $$\rho = (\rho' + b)/a \qquad (2), \text{ and}$$

$$\theta = (\theta' + B)/A \qquad (3)$$

Thus, at the position of the host image occupied by the preceding vehicle, the corresponding pixels located at the polar coordinates (ρ', θ') relative to the epipole e' can be obtained. Upon such an arrangement, from the image captured by the preceding vehicle, each pixel at the polar coordinate (ρ, θ) relative to the epipole e can be used to blend with the pixel at the coordinate (ρ', θ') relative to the epipole e'.

It is worth notice that, in order to prevent the preceding vehicle from becoming completely invisible after the aforesaid in-painting manipulation, in the embodiment, a transparency is designated with a weighting α(ρ') (between 0 and 1) of the pixel for filling That is to say, according to the weighting α(ρ'), which determines the transparency with respect to the distance between the position of the blind pixel and the one of the epipole of the image captured by the host vehicle, each pixel of the host image occupied by the preceding vehicle and the corresponding pixel in the image captured by the preceding vehicle are blended according to $$I'(\rho', \theta') = (1 - \alpha(\rho'))I(\rho(\rho'), \theta(\theta')) + \alpha(\rho')I'(\rho', \theta') \qquad (4)$$

In equation (4), α(ρ')∈[0,1] and ρ'∝α(ρ'). That is, ρ' gets smaller as α(ρ') decreases, or ρ' gets larger as α(ρ') increases. Therefore, in the blended image for the host vehicle, the pixels occupied by the preceding vehicle 1 are blended with the pixels extracted from the image captured by the preceding vehicle 1 according to the weighting α(ρ') in (4). In the image captured by the host vehicle, as the pixels get closer to e', i.e., as ρ' gets smaller, the ratio of the pixel by the preceding vehicle 1 (for fusing) is larger. Conversely, as the pixels get farther away from e', i.e., as ρ' gets larger, the ratio of the corresponding pixel in the image captured by the host vehicle is larger.

In the embodiment, except for the inter-vehicle communication devices such as WAVE/DSRC devices, the device for broadcasting images captured by the preceding vehicle and the devices for receiving broadcast information in the host vehicle may also be a WiFi, a WiMAX, an LTE device, or any other communication device capable of implementing inter-vehicle communications. In addition to the image information, the broadcast signals should also include GPS positioning information of the preceding vehicle. This is because such a type of transparentization/translucentization system only needs to be activated when it is confirmed that the preceding vehicle is in the same lane as the host vehicle and travels too close to the host vehicle.

In practice, the fused semitransparent image may be displayed on a screen for the driver, and may also be projected to a windshield having thereon a head-on display for the driver to view a (semi)transparent preceding vehicle.

Further, the embodiment may be installed to any single-core or multi-core device, such as an embedded system including a smart phone, or an automobile computer, which has computation capabilities and is capable of executing one or more programmed instructions.

The embodiment offers the following superior features.

First of all, a blind spot caused by a preceding vehicle to a host/following vehicle can be eliminated, so a two-vehicle collision caused by insufficient spacing between the host vehicle and the preceding vehicle can be reduced to a minimum by having the host vehicle to "see through" the preceding vehicle and thereby to gain a little more time for reacting against any situation in front of the preceding vehicle. Namely, even though an unacceptable in-between spacing, which might cause accident, exists, the host vehicle can still have an improved driving safety against any emergency situation occurring in front of the preceding vehicle. Actually, with the help of the aforesaid device and method in accordance with the present invention, the driver of the host vehicle can react in the same time as the driver of the preceding vehicle. Thereby, the crisis in lacking response time to overcome insufficient spacing (mainly caused by the driver's neural reaction lag and mechanical braking lag in the actuator) can then be substantially reduced, and thus a tragedy chain collision propagated from a two-car collision can be effectively avoided.

Secondly, for the aforesaid technique can have the preceding vehicle to become (semi)transparent so that the scenes in front of the preceding vehicle can be observed directly by the driver of the host vehicle so as to allow the driver of the host vehicle to better learn the driving conditions ahead, the driving safety can be ensured because to maintain a relatively close distance between the host vehicle and the preceding vehicle is possible and safer.

In the embodiments, when a blind spot caused in a view of the driver of the host vehicle by a preceding vehicle, which travels on the same lane as the host vehicle does and is too close to the host vehicle, an image captured by the preceding vehicle (the preceding image) is first received by the host vehicle via the inter-vehicle communication, and then the preceding image is used to provide pixels for in-painting the blind spot of the host vehicle. In the image of the host vehicle, the preceding vehicle body is (semi) transparentized with appropriate processing techniques, so that the driver of the host vehicle can have a first-hand knowledge of travel conditions ahead of the preceding vehicle and thereby the possibility of front-end collision to the host vehicle can be substantially reduced.

The dynamic fusion method and device of images according to the embodiments of the disclosure can be implemented by a processing unit, a digital signal processing unit, a digital video processing unit, and/or a programmable integrated circuit such as a microcontroller and a field programmable gate array, and can be designed by using a hardware description language (HDL).

Alternatively, the dynamic fusion method and device of images according to the embodiments of the disclosure can be implemented by software programs. For example, a code of the embodiments can be recorded in a recording medium, e.g., a medium such as a memory, a ROM and a RAM, or any other optical or magnetic recording media the like, or may be implemented as firmware. When a processing unit of a computation device accesses and executes the code of the embodiments of the disclosure, the dynamic fusion method and device of images according to embodiments of the disclosure can be implemented. Further, the dynamic fusion method and device of images according to embodiments of the disclosure can be implemented by any combination of software, hardware and firmware.

Thus, a dynamic fusion method and device of images are as described in the foregoing embodiments of the disclosure to eliminate a blind spot caused by a preceding vehicle. An image captured by the preceding vehicle is broadcast through WAVE/DSRC and is received by a host vehicle. The host vehicle determines a position of the preceding vehicle in an image captured by the host vehicle through vehicle detection algorithms, locates the respective epipole in each of the two images, and determines a scale factor according to a background image observed by both of the cameras in the two vehicles. As such, the blind spot caused by the preceding vehicle body can be eliminated from the image captured by the host vehicle with in-painting technique to blend the pixels consisting of the preceding vehicle's body in the image captured by the host vehicle with their counterpart in the image captured by the preceding vehicle. The above WAVE/DSRC is a core technique highly ranked in intelligent transportation systems (ITS). In the WAVE/DSRC technique, based on IEEE 802.11p and IEEE1609 specifications, an on-board unit (OBU) and a roadside unit (RSU) transmit data through 5.9 GHz (5.85-5.925 GHz) microwave frequency bands to establish vehicle-to-vehicle (V2V) and vehicle-to-infrastructure (V2I) short-distance communications. Compared to wireless communication techniques such as GSM, GPRS, WCMDA, HSDPA and WiMAX that establishes connections with a base station via multiple stopovers, the WAVE/DSRC is an independent channel for the exclusive use of vehicle systems that allow direct V2V and V2I connections for in real-time completing information broadcast.

According to an exemplary embodiment of the disclosure, a dynamic fusion and transparentization method of images comprises a step of receiving an image captured by a preceding vehicle and the position information of the preceding vehicle, a step of determining whether the preceding vehicle travels in the same lane as a host vehicle, a step of determining the pixels occupied by the preceding vehicle in the image captured by the host vehicle according to a vehicle detection algorithm, a step of obtaining epipoles of the host vehicle and the preceding and obtaining the scale factor describing the relation of the pixels around each epipole according to the feature correspondences in a common background observed by the two cameras, a step of extracting an image near the epipole of the preceding image and scaling down the extracted image according to the scale factor, a step of blending the scaled image with pixels near the epipole of the host image, wherein a blending boundary of the host image for defining the preceding vehicle therein is determined according to a vehicle detection algorithm.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A dynamic fusion method of images, comprising the steps of:
    receiving broadcast information transmitted from surrounding vehicles of a host vehicle;
    determining according to the broadcast information whether at least one of the surrounding vehicles travels longitudinally with the host vehicle in the same lane, and defining the at least one of the surrounding vehicles individually and correspondingly as at least one neighboring vehicle of the host vehicle;
    determining whether a preceding vehicle from the at least one neighboring vehicle exists, wherein the preceding vehicle travels along just in front of the host vehicle and blocks a view of the host vehicle; and
    performing a transparentization process on the preceding vehicle when the preceding vehicle is spaced from the host vehicle at a distance less than a predetermined minimum spacing.

2. The dynamic fusion method of claim 1, wherein the transparentization process includes the steps of:
    obtaining feature correspondences from the images captured by the preceding vehicle and the host vehicle so as to determine the two respective epipoles in the corresponding images and a scale factor defining a ratio relation of pixels near the two epipoles;
    extracting an image near the epipole of the image of the preceding vehicle, and scaling down the extracted image according to the scale factor; and
    blending the scaled image with pixels within a boundary near the epipole of the image of the host vehicle.

3. The dynamic fusion method of claim 2, further including the step of:
    while in obtaining the feature points from the respective images of the preceding vehicle and the host vehicle, locating a correspondence from the images, and calculating a corresponding relation between the feature correspondences with respect to the correspondence in the images of the two vehicles according to an equation of $p'^T F p = 0$, wherein the p is coordinate of the correspondence in the image of the preceding vehicle, the p' is coordinate of the correspondence in the image of the host vehicle, and the F is a fundamental matrix.

4. The dynamic fusion method of claim 3, wherein the equation is one of a scale-invariant feature transform (SIFT) algorithm and a speeded-up robust feature (SURF) algorithm.

5. The dynamic fusion method of claim 2, further including the steps of:
    estimating a fundamental matrix from the feature correspondences so as thereby to obtain the respective epipoles of the images of the preceding vehicle and the host vehicle and the ratio relation of the pixels near the two epipoles; and
    extracting pixels around the epipole of the image of the preceding vehicle and pixels around the epipole inside the preceding vehicle body in the image of the host vehicle according to the ratio relation, and blending the extracted pixels in the image of the host vehicle with the ones in the image of the preceding vehicle, wherein a boundary defining the vehicle body is determined by a vehicle detection algorithm.

6. The dynamic fusion method of claim 2, wherein the images of the preceding vehicle and the host vehicle are obtained by a plurality of image sensors.

7. The dynamic fusion method of claim 6, further comprising:
    obtaining a geometric relation between the images based on the feature correspondences of the images; and
    blending the images of the preceding vehicle and the host vehicle according to the geometric relation.

8. The dynamic fusion method of claim 6, wherein one of the image sensors is one of an infrared image capturing device, an optoelectronic coupling element and a metal-oxide complementary (MOS) photosensitive element.

9. The dynamic fusion method of claim 6, wherein, when the image sensors are installed in the preceding vehicle and the host vehicle, the images are mutually transmitted via a wireless communication.

10. The dynamic fusion method of claim 9, wherein the broadcast information or the images are transmitted via the wireless communication, and the wireless communication is one of Dedicated Short Range Communications/Wireless Access in a Vehicular Environment (DSRC/WAVE), a Wi-Fi, a WiMax and an LTE.

11. The dynamic fusion method of claim 5, wherein the ratio relation is expressed by one of a linear formula and a non-linear formula.

12. The dynamic fusion method of claim 5, wherein an origin of a coordinate system for elucidating the ratio relation is one of the epipole of the image of the host vehicle and an arbitrary point in the image of the host vehicle.

13. The dynamic fusion method of claim 1, wherein the broadcast information includes image information and positioning information of the surrounding vehicles.

14. The dynamic fusion method of claim 1, wherein a resulted level of the transparentization process is one of a transparent state, a semitransparent state, and a middle state between the transparent state and an opaque state.

15. A dynamic fusion device of images, comprising:
a capturing unit, for capturing surrounding images of a host vehicle;
a receiving unit, for receiving broadcast information transmitted from surrounding vehicles of the host vehicle;
a processing unit, coupled to the receiving unit and the capturing unit, for determining whether at least one of the surrounding vehicles travels longitudinally with the host vehicle in the same lane, for defining at least one of the surrounding vehicles individually and correspondingly as at least one neighboring vehicle of the host vehicle, for determining whether a preceding vehicle from the at least one neighboring vehicle exists, wherein the preceding vehicle travels along just in front of the host vehicle and blocks a view of the host vehicle, and for performing a transparentization process on the preceding vehicle when the preceding vehicle is spaced from the host vehicle at a distance less than a predetermined minimum spacing.

16. The dynamic fusion device of claim 15, wherein the transparentization process performed by the processing unit includes the steps of:
obtaining feature correspondences from images captured by the preceding vehicle and the host vehicle so as to determine the two respective epipoles of the images and a scale factor defining a ratio relation of pixels near the two epipoles;
extracting an image near the epipole of the image of the preceding vehicle, and scaling down the extracted image according to the ratio factor; and
blending the scaled image with pixels within a boundary near the epipole of the image of the host vehicle.

17. The dynamic fusion device of claim 16, wherein the processing unit further obtains the feature points from the respective images of the preceding vehicle and the host vehicle, matches the feature points in the images of the two vehicles to form feature correspondences according to a predetermined algorithm.

18. The dynamic fusion device of claim 16, wherein the processing unit further includes
estimating a fundamental matrix based on the feature correspondences so as thereby to obtain the respective epipoles of the images of the preceding vehicle and the host vehicle and further extracting pixels defining the preceding vehicle body in the image of the host vehicle based on the ratio relation; wherein the extracted pixels defining the preceding vehicle body in the image of the host vehicle are blended with the corresponding pixels in the image of the preceding vehicle around the epipole thereof as a center, wherein a boundary for the blending is determined by a vehicle detection algorithm.

19. The dynamic fusion device of claim 18, wherein the images of the preceding vehicle and the host vehicle are captured by the images captured by a plurality of image sensors.

20. The dynamic fusion device of claim 18, wherein the processing unit further obtains a geometric relation between the images based on the feature correspondences of the images, and blends the images of the preceding vehicle and the host vehicle according to the geometric relation.

21. The dynamic fusion device of claim 15, further including:
a display unit, coupled to the processing unit, for displaying the transparentized preceding vehicle.

22. The dynamic fusion device of claim 21, wherein the display device is one of a head-on display, a monitor and another image display device.

23. The dynamic fusion device of claim 15, wherein the capturing unit is an image sensing device having one of a video camera, a camera and other image capturing device.

24. The dynamic fusion device of claim 23, wherein the image sensing device is one of an infrared image capturing device, an optoelectronic coupling element, and a MOS photosensitive element.

25. The dynamic fusion device of claim 15, wherein the receiving unit of the host vehicle receives an image of the preceding vehicle captured by the capturing unit, the preceding vehicle captures an image of a further-preceding vehicle that travels in front of the preceding vehicle, and the images are transmitted to the receiving unit of the host vehicle via a wireless communication.

26. The dynamic fusion device of claim 15, wherein the receiving unit of the host vehicle receives a warning generated by one of a brake of the further-preceding vehicle and a collision between the preceding vehicle and the further-preceding vehicle, and the warning is transmitted to the receiving unit of the host vehicle via the wireless communication.

\* \* \* \* \*